United States Patent [19]
Chang

[11] Patent Number: 4,615,087
[45] Date of Patent: Oct. 7, 1986

[54] CONTINUOUS MECHANISM FOR RE-MOULDING, LENGTH-SETTING AND ASSEMBLING BLIND'S PLASTIC STRIPS

[76] Inventor: A-Shen Chang, 15, Lane 494, Fu Chien Rd., Fu Hsing Ts'un, Fu Hsing Hsiang, Changhua Hsien, Taiwan

[21] Appl. No.: 775,262

[22] Filed: Sep. 12, 1985

[51] Int. Cl.[4] .............................................. B23P 19/04
[52] U.S. Cl. ...................................................... 29/24.5
[58] Field of Search .................. 29/24.5, 34 R, 564.6, 29/564.8, 874, 884

[56] References Cited

U.S. PATENT DOCUMENTS 3,710,464 1/1973 Persson ................................ 29/24.5
4,073,044 2/1978 Edixhoven ........................... 29/24.5
4,420,862 12/1983 Edixhoven ........................... 29/24.5
4,450,701 5/1984 Treiber et al. ....................... 29/24.5
4,516,300 5/1985 Gaillard et al. ...................... 29/24.5

*Primary Examiner*—Howard N. Goldberg
*Assistant Examiner*—Steven Nichols
*Attorney, Agent, or Firm*—Browdy and Neimark

[57] ABSTRACT

A continuous mechanism for re-moulding, length-setting and assembling blind's plastic strips includes a secondary working equipment for re-moulding the blind's strip fed from a reeled strip source in the fore section, an induction-type shearing mechanism in the mid section for length-setting and rope hole punching and an assembling mechanism in the end section for assembling the strips sent from the shearing mechanism. Such a continuous mechanism has a high manufacturing efficiency and demands a little manual labor.

2 Claims, 12 Drawing Figures

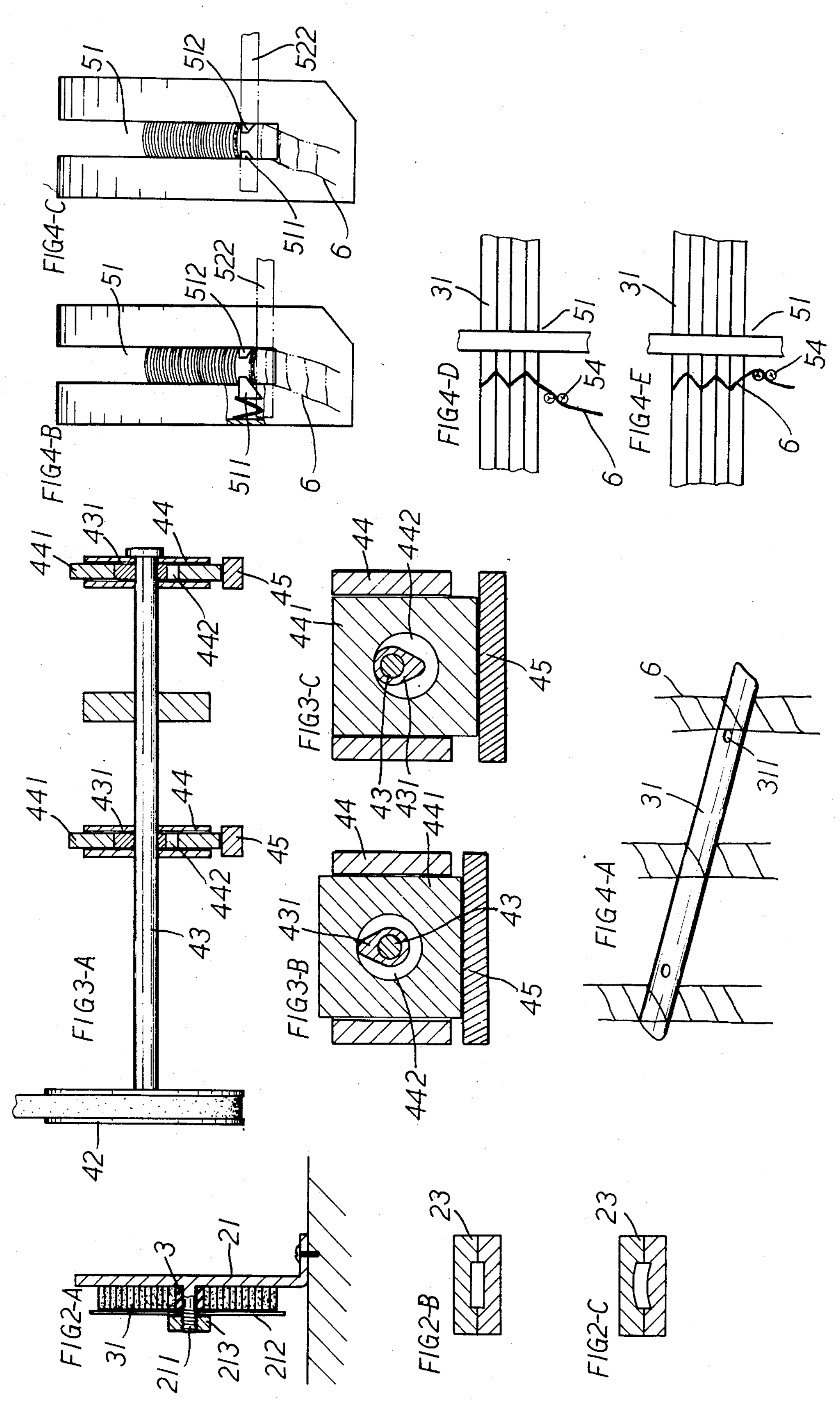
FIG4-C
51
512
522
511
6
FIG4-B
FIG4-D
31
54
FIG4-E
FIG3-A
441
431
44
442
45
43
42
FIG3-B
FIG3-C
FIG4-A
311
FIG2-A
3
21
211
213
212
FIG2-B
23
FIG2-C

CONTINUOUS MECHANISM FOR RE-MOULDING, LENGTH-SETTING AND ASSEMBLING BLIND'S PLASTIC STRIPS

SUMMARY OF THE INVENTION

A continuous mechanism for re-moulding, length-setting and assembling blind's plastic strips is an automatically continuous one which re-moulds and length-sets blind's strips from a reeled strip source and passes the blind's strips into stair-like ropes of a blind. The mechanism includes a secondary working equipment in the fore section for re-moulding the strip fed from the reeled strip source, an induction-type shearing mechanism in the mid section for length-setting and rope holes punching and an assembling mechanism in the end section for passing the respective strip shorn by the shearing mechanism into the respective stair holes of the stair-like ropes to achieve a convenient, accurate and high-speed operation.

Conventionally, manufacturing the plastic blinds calls for a large quantity of manual operation. For example, in performing the assembly of the plastic strips, there demands a strip moulding department, a length-setting and shearing department, an assembling department for passing strips into stair-like ropes and a transporting department for conveying the articles among the different departments. Therefore, the assembly is time-consuming and will be interrupted if the size is wrong owing to artificial error or some kind of delay occurs in the transporting department. Furthermore, it is difficult to achieve an accurate and high-speed manufacturing by manual assembly since which has a low manufacturing efficiency and quality. It is therefore tried by the present applicant to deal with the above shortcomings encountered by the prior art.

The main object of the present invention is to provide a continuous mechanism for re-moulding, length-setting and assembling blind's plastic strips to replace the conventional manual operation in order to achieve an elevated economical efficiency and attempt an automatically accurate and high-speed assembling operation.

It is therefore another object of the present invention to provide a continuous mechanism for re-moulding, length-setting and assembling blind's plastic strip, which is converted to minimize the required space for operation, to avoid artificial errors and to deduct transporting costs.

The present invention may best be understood by examining a preferred embodiment thereof with reference to the accompanying drawings, in which:

DESCRIPTION OF DRAWING

FIG. 2A is a schematic view showing the feeding of blind's strip of the present invention;

FIG. 2B is a schematic view showing a secondary moulding of the present invention;

FIG. 2C is further a schematic view showing a secondary moulding of the present invention;

FIG. 3A is a schematic view showing a shearing mechanism of the present invention;

FIG. 3B is a schematic view showing the action of the shearing mechanism of the present invention;

FIG. 3C is further a schematic view showing the action of the shearing mechanism of the present invention;

FIG. 4A is a schematic view showing the passing of a blind's strip into stair-like ropes of the present invention;

FIG. 4B is a schematic view showing the assembling action of blind's strips of the present invention;

FIG. 4C is further a schematic view showing the assembling action of blind's strips of the present invention;

FIG. 4D is a schematic view showing the swaying action of the stair-like ropes of the present invention; and FIG. 4E is further a schematic view showing the swaying action of the stair-like ropes of the present invention.

DETAILED DESCRIPTION

Figure 1:
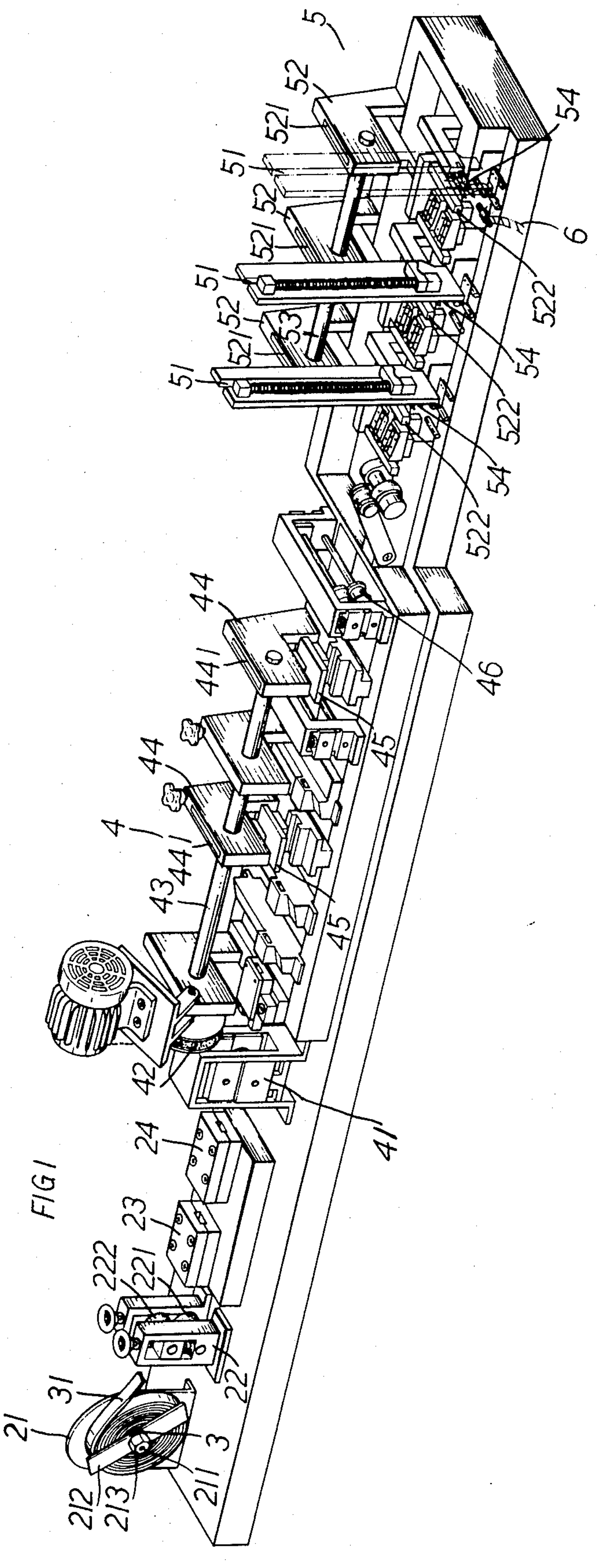
FIG. 1 is a perspective view showing a preferred embodiment of the present invention.

Referring now to FIG. 1, the present invention adapted is devised to assemble blind's strips after re-moulding and shearing the strip fed from a reeled strip source by an integrated mechanism which performs re-moulding in the fore section, length-setting and shearing in the mid section and assembling in the end section.

In the fore section, as supplementarily shown in FIG. 2A, there is a vertical disc 21 the central portion of which is formed with a bolt 211 which is to be sleeved thereon a reel 3 which reels thereon a continuous strip 31 which acts as a strip source for feeding therefrom strip 31, with a nut 213 engaging with bolt 211 for urging a positioning plate 212 against continuous strip 31.

Strip 31 passes through a pressure-type roller conveyor 22, which includes a lower dynamic roller 221 and an upper pressure roller 222, into a thermo-plastic mold 23 to have the original rectangular crossection as shown in FIG. 2B changed into arcuate one as shown in FIG. 2C, and then passes into a circulating-water-cooling-type cooling mold 24 for being further processed.

Re-moulded strip 31 passes through a roller conveyor 41 and enters beneath a two ends shearing mechanism 4 which is activated to have dynamic disc 42 drive the driven shaft 43 a turn when strip 31 passes through a sensing device (which can be an infrared indicator or a contact switch) mounted on a particular position. Shaft 43 rotatably passes through two fixed frames 44 the middle portion of each of which, as shown in FIGS. 3A and 3B, slidably receives therein a positioning plate 441 having a central hole 442 in which a cam 431 mounted on shaft 43 engages. Thus, upper shearing mold 45 connected to positioning plate 441 is raised to be in a ready status when the most eccentrical portion of cam 431 is turned upright to urge positioning plate 441 in the top position.

As shown in FIG. 3C, when strip 31 passes through the sensing device and the most eccentrical portion of cam 431 is turned to be in the lower position, by suitable provision, positioning plate 441 and shearing mold 45 will be downdardly forced to cut the strip 31 thereunder with a set length.

Certainly, shearing mold 45 can be mounted thereon a rope hole punching block so that a strip 31 as shown in FIG. 4A with a set length and a rope hole 311 can be obtained.

An assembling mechanism 5 is to pass a respective strip 31 into the respective stair holes of three stair-like ropes for blind's strip as shown in FIG. 4A.

Shorn strip 31 passes through a roller conveyor 46 and enters into the bottoms of three strip receiving spaces 51 as supplementarily shown in FIG. 4B. 3 stair-like ropes 6 are hung on the position where strip 31 will pass so as to obtain any a strip 31 like that shown in FIG. 4A.

Similar to that of shearing mechanism 4, assembling mechanism 5 includes a plurality of fixed frames 52 through which driven shaft 53 rotatably passes. The positioning plate 521 of assembling mechanism 5 connects thereto a pushing rod 522 which originally positions beneath the entering strip 31.

Above the bottoms of receiving spaces 51, there are provided with pairs of retractable elastic brackets 511 and 512 so that when strip 31 fully passes through the three stair-like ropes 6 to reach an end sensing device, shaft 53 is turned to have pushing rod 522 push upwardly strip 31 through brackets 511 and 512 to rest thereon as shown in FIGS. 4B and 4C. Then, pushing rod 522 returns to its lower position, and the pushed strip 31 will automatically stretch the next stair hole for the passing of the next strip 31 to be pushed by pushing rod 522.

In order to orderly overlap pushed strips 31 in receiving spaces 51 above brackets 511 and 512, at the middle section of supplying stair-like rope 6, a synchronously swaying suspending rod 54 for stair-like rope 6 is provided beneath each pushing rod 522, i.e. as shown in FIGS. 4D and 4E, suspending rod 54 will change its left or right position every when a strip 31 enters above pushing rod 522 to overlap pushed strips 31 as shown.

Through the above description, a continuous mechanism for re-moulding, length-setting and assembling blind's plastic strips according to the present invention, apparently, has made a great improvement over the conventional manual assembling operation.

I claim:

1. A continuous mechanism for re-moulding, length-setting and assembling blind's plastic strips comprising a strip feeding and re-moulding department in a fore section, a length-setting and shearing department in a mid section and an assembling department in an end section, wherein the fore section includes a vertical disc formed on one side thereof, a bolt which is sleeved thereon, a reel reeling thereon a continuous strip, which is confined between a positioning plate mounted on said bolt and said vertical disc, passing through a pressure-type roller conveyor into a thermoplastic re-moulding means and a cooling means; the mid section includes a dynamic disc, activated by a sensing device mounted on a particular position, for driving a driven shaft; said driven shaft rotatably passes through a plurality of fixed frames the middle portion of each of which slidably receives therein a positioning plate in said respective fixed frame in one of a raised position and a lower position so that when said positioning plate in said respective frame is in said lower position, an upper shearing mold connected to said positioning plate in said respective fixed frame will cut the strip thereunder with a set length; the end section includes a dynamic shaft rotatably passing through a plurality of fixed frames, having positioning plates driven to move vertically by eccentric cams attached to said dynamic shaft similar to those in said mix section and a pushing rod connected to each positioning plate, and driven by said respective positioning plate to which it is attached in this section for passing a strip, which has passed into the respective stair holes of stair-like ropes for blind's strip, through pairs of restractable brackets mounted above the bottoms of strip receiving spaces for overlapping pushed strips in said receiving spaces on said retractable brackets to have a continuous assembly for blind's strips.

2. An automatically assembling mechanism for blind's strips according to claim 1 wherein at the middle section of supplying the stair-like rope, i.e. beneath each said pushing rod, there is provided a suspending rod for said stair-like rope for synchronously swaying between the left and the right positions in order to orderly overlap said pushed strips in said receiving spaces.

* * * * *